United States Patent Office 2,712,506
Patented July 5, 1955

2,712,506

ASPHALT EMULSION AND A PROCESS OF COATING A GLASS FIBER MAT WITH IT

Robert W. Farris, Newark, Ohio, assignor to Owens-Corning Fiberglas Corporation, a corporation of Delaware No Drawing. Application May 24, 1951,
Serial No. 228,142

8 Claims. (Cl. 106—277)

This invention relates to asphaltic emulsions and more particularly to asphaltic emulsions for use in combination with glass fibers in the manufacture of bonded mat which, when in position of use, may be further combined with the asphaltic emulsion in the fabrication of roofing, insulation, asphaltic shingles, pipe wrap and the like.

In the use of asphaltics as an impregnant or as a binder in the manufacture of structures with glass fibers it has been found more expedient, safer and more economical to make use of the asphaltic materials dispersed as fine particles or globules in aqueous emulsion than to employ solvent solutions of the material. Rapid set has been found difficult to achieve with solvent solutions because of the normally slow evaporation rate of the solvent component and the solvent normally is not only highly combustible but expensive as well. It is also vastly better from the standpoint of fabricating technique to make use of such asphaltic emulsions rather than hot melts of the corresponding asphaltic material. Hot melts require the use of melting equipment and transporting equipment which cannot always be made readily available at stations of use and very often the melt is so viscous and of such character that satisfactory penetration of glass fiber fabrics or the like is not achieved and bonding with underlying layers to achieve suitable integration is usually insufficient. In order to achieve more satisfactory protection by application from hot melts, it has been the practice to apply the asphaltic materials in greater quantity than would ordinarily be necessary.

Unfortunately, the use of asphaltic emulsions in the fabrication of glass fiber structures has not been free of a number of difficulties. Glass fibers possess certain properties which tend to limit wetting out and inhibit penetration of the asphaltic emulsion. Ordinarily when asphaltic emulsions are applied as an impregnant for glass fiber fabrics, the emulsion tends to film over the fabric instead of impregnating the fabric and foaming which is often encountered in the use of asphaltic emulsions renders penetration of the fabric still more difficult so that lack of bonding or anchorage to underlying coatings is experienced.

It is desirable to make use of an emulsion which in combination with a glass fiber fabric is able to set rapidly into a highly flexible, tack-free product so as to permit handling almost immediately after treatment. It is important in order to achieve satisfactory application, to make use of an asphaltic emulsion characterized by low viscosity and relatively high solids content but it is desirable to achieve reduction in viscosity without sacrifice of stability, shelf life or any of the other properties which provide for good penetration and rapid set of the asphaltic material to form a tack-free, flexible structure. When in position of use, it is important that the asphaltic material deposited from emulsion have good resistance to deterioration, hardening or cracking under all weather conditions to which it might be exposed and that it be highly resistant to oxidation.

It has been difficult to formulate an asphaltic emulsion which is able to supply all or most of the desirable characteristics described. In an effort to incorporate these properties in an asphaltic emulsion used in combination with glass fiber materials, a wide variety of chemical compounds in the form of wetting agents, surface tension modifying agents, stabilizers and emulsifying agents have been formulated into various asphaltic emulsions. A limited number of chemical compounds were able to reduce viscosity of asphaltic emulsions. This is especially true of most metal salts of petroleum sulfonic acid, metal salts of fatty acid sulfonates, or fatty acid amides and the like. Compounds having the ability to reduce viscosity failed to embody one or more of the properties for increasing penetration, great decrease of thixotropic effect and ability to set rapidly into a flexible, tack-free film having good weathering characteristics. For example, polyoxyethylene derivatives such as sorbitan monolaurate polyoxyethylene, sorbitan monostearate polyoxyethylene, or sorbitan monopalmitate polyoxyethylene, or the like, or sodium salts of sulfonated fatty alcohols, alkyl aryl sodium sulfonates and the like are able to lower viscosity but fail in one or more of the other characteristics, such as weathering, penetrability, film strength, thixotropic effect, foaming, or the like.

It is an object of this invention to produce an asphaltic emulsion which is not subject to the limitations described and it is a related object to produce improved glass fiber-asphaltic structural products making use of same.

It has been found that the viscosity of an emulsion may be greatly lowered without introducing an objectionable thixotropic condition, that the penetrability of the glass fiber mat or fabric may be greatly increased and the asphaltic component quickly set into a highly flexible, tack-free product having good weathering and oxidation resistance when the emulsion is formulated with a small amount of an anionic compound in the form of a hydrophilic salt of di(2-ethyl hexyl) phosphoric acid, namely, sodium di(2-ethyl hexyl) phosphate, potassium di(2-ethyl hexyl) phosphate, lithium di(2-ethyl hexyl) phosphate, ammonium di(2-ethyl hexyl) phosphate, and the like.

The amount of anionic compound effective for achieving the desired results in the asphaltic emulsion ranges from 0.005 to 1.0 percent by weight based on the amount of asphaltic emulsion. More than 1.0 percent by weight can be used but proportionate reduction in viscosity and increase in mat penetration are not achieved. The preferred amount of anionic compound in the asphaltic emulsion ranges from 0.01 to 0.45 percent by weight. Since the additive is soluble in substantially all proportions in water, it is convenient to prepare a stock solution of the water soluble salt of di(2-ethyl hexyl) phosphoric acid and incorporate the desired amount of the solution in the asphaltic emulsion with or without further dilution with water.

For the preparation of bonded mat, it is preferred to make use of an emulsion having an asphaltic content ranging from 1–15 percent by weight with a range of 10–15 percent by weight being favored. For impregnation of mat, preferably bonded with asphaltic material deposited from an emulsion embodying features of this invention, as in the manufacture of pipe wrap, asphaltic shingles, roofing, or the like, the asphaltic content of the emulsion may range from 30–60 percent by weight but it is preferred to make use of an emulsion having 35–50 percent asphalt. Even in the presence of the water soluble salt of di(2-ethyl hexyl) phosphoric acid, when more than 60 percent by weight asphalt is present in the emulsion, instability appears to result and the emulsion very often breaks more rapidly than desired and makes application by ordinary techniques and equipment less practical. In the practice of this invention, it is preferred to make use of an asphaltic emulsion containing less than 60 percent solids and particular benefit results when the asphaltic emulsion also contains 1-10 percent by weight bentonite or other finely divided clay as a dispersing agent.

Application of the asphaltic emulsion in the manufacture of bonded mat of glass fibers may be achieved by way of a flow-coating process in which a constant stream of the emulsion is poured over the glass fiber mat after it is formed. In the event that the mat is self-sufficient, application of the emulsion may be effected by way of a dip squeeze process or the like. In any event, it is preferred to remove excess emulsion by a squeeze process so that minimum asphalt will be present sufficient fully to cover the fibers and bind the fibers together into the mat. Ordinary treatment to deposit about 40 percent by weight asphalt in the bonded mat is sufficient but the amount of asphalt may vary from 20–50 percent by weight.

After application of the emulsion to the mat of glass fibers, rapid set to conditions for handling is achieved by heat treatment at temperatures ranging from 250°–850° F. upon exposure of 2–10 minutes. Heat treatment of the type described should preferably be carried out in an air circulating oven to achieve more rapid removal of the aqueous diluent. The cooled mat can be handled with little difficulty. It will be understood in this connection that if time is available, setting may be achieved without the use of heat treatment.

Certain tests have been devised to correlate the properties desired in an asphaltic emulsion when employed as an agent in the manufacture of bonded mat or as the coating or impregnating composition for roof mat, roofing shingles, pipe wrap, and the like. These tests, described hereafter, have been used to compare the asphaltic emulsions embodying features of this invention with asphaltic emulsions formulated with other additives. Non-ionic compounds have been eliminated from the start because they have been found to have no effect on the reduction of viscosity of the emulsion and in most instances they have tended to increase viscosity and to increase the thixotropic effect. In some cases, the emulsion is caused to invert or break. Comparison of anionic compounds each of which gives some reduction in viscosity is made by way of additions to an asphaltic emulsion containing 50 percent by weight asphalt and 3 percent by weight clay.

The following tests were made for purposes of comparing the ability of each of the emulsions to function in the manner intended:

1. Amount of additive

Determination was made of the amount of surface active agent required to reach minimum viscosity.

2. Thixotropic effect

After the emulsion had the optimum amount of surface active agent or additive incorporated, the emulsion was allowed to stand for one hour after which it was checked to determine whether any thickening or gelling had taken place.

3. Penetration

A bonded mat of glass fibers ordinarily used for roofing was positioned over a clean sheet of kraft paper and asphaltic emulsion added dropwise from a height of about 8 inches. The material was allowed to stand for 30 minutes and then the mat removed to observe whether or not penetration had taken place and the amount thereof.

4. Film test

Films formed of each of the emulsions were spread upon a paper and allowed to dry overnight. Measurements were made to determine the amount of pitting, scum formation and the extent of through drying relative to thickness.

5. Foaming

Foam presents a problem because the presence thereof renders proper penetration of the glass fiber fabric more difficult. Each emulsion was observed to determine the amount of foam formed.

COMPARISONS OF ASPHALTIC EMULSIONS FOR TREATMENT WITH GLASS FIBER FABRICS

| Additive | Percent Additive to Minimum Viscosity | Decrease in Viscosity | Thixotropic effect | Mat Penetration | Film Test |
|---|---|---|---|---|---|
| 1. Sodium di(2-ethyl hexyl) phosphate. | 0.45 | Good | Very slight | Good | Good. |
| 2. Polyhydric alcohol ester of high molecular weight mineral organic acids. | 2.5 | Fair | Great | Poor | Poor. |
| 3. Polyoxyethylene ether | 5.0 | ...do | ...do | Fair | Do. |
| 4. Sorbitan monolaurate | 2.5 | ...do | None | Poor | Do. |
| 5. Sulfonated mineral oil | 1.75 | Good | Great | ...do | Fair. |
| 6. Sodium salt of sulfonated fatty alcohol. | 1.0 | Fair | Slight | ...do | Do. |

It will be observed from the above comparisons that an emulsion embodying the additive in amounts up to 0.45 percent by weight sodium di(2-ethyl hexyl) phosphate provides for excellent reduction in viscosity, excellent penetration, no thixotropic effect, good mat penetration and film characteristics, whereas non-ionic compounds are eliminated in the first instance and others of anionic character compared above fail in one or more of the other desirable properties.

By way of illustration of uses which may be made of asphaltic emulsions embodying features of this invention, reference will be made to the manufacture of pipe wrap and roofing with present practice.

In the present practice for the manufacture of roofing, a layer of asphalt in molten condition is spread as a base over the surface to be covered. One or more glass fiber bonded mats, preferably in the form of continuous webs, are laid on top and then one or more layers of asphalt in molten condition are webbed over the surface for the purpose of building up a relatively thick layer of asphalt which is reinforced and bonded to the base. It is desirable to have the various layers integrated into a substantially void-free, composite structure for the purpose of enhancing weather resistance and serviceability. To accomplish this end, it is important for the asphaltic material applied as the top coat easily and quickly to penetrate the mat, otherwise the voids will not be filled and anchorage between the top and base coats will not be complete.

Attempts to substitute aqueous emulsions of asphalts for hot melt in the manufacture of roofing have met with failure because of the tendency for the asphaltic emulsion to film over and not penetrate the glass fiber mat and the inability to achieve rapid set for drying. Many asphaltic emulsions foamed badly and rendered penetration even more difficult and this lack of penetration and lack of ability for rapid set coupled with the presence of the additive led to poor weathering properties. When asphaltic emulsions prepared in accordance with this invention are used in the manufacture of roofing, the above mentioned difficulties appear to be completely overcome. Penetration of the emulsion through the glass fiber mat and excellent bond to the undercoat is achieved and the asphaltic component sets rapidly to form a uniform, weather resistant, composite layer having good wearing properties. The stability of the emulsion permits the emulsion to be piped over relatively long distances and to be processed through normal fluid handling equipment to make it more readily available for applications where otherwise such usage might be faced with difficulties with respect to labor and equipment.

It will be understood that the term asphalt, as used herein and in the claims, is intended to include natural asphalt, blown asphalt, petroleum asphalt and the like bitumens.

It will be further understood that numerous changes may be made in the details of composition and use without departing from the spirit of the invention, especially as defined in the following claims.

I claim:

1. An asphaltic composition comprising from 1 up to 60 percent by weight of asphalt in water emulsion containing 0.005–0.5 percent by weight of sodium di(2-ethyl hexyl) phosphate.

2. An asphaltic composition comprising from 1 to 60 percent by weight of asphalt in water emulsion containing 0.005–0.5 percent by weight of potassium di(2-ethyl hexyl) phosphate.

3. An asphaltic composition comprising from 1 up to 60 percent by weight of asphalt in water emulsion containing 0.005–0.5 percent by weight of an anionic hydrophilic compound selected from the group consisting of ammonium di(2-ethyl hexyl) phosphate and an alkali metal di(2-ethyl hexyl) phosphate.

4. An asphaltic composition comprising from 1 up to 60 percent by weight of an asphalt in water emulsion containing 0.005–0.5 percent by weight of an anionic hydrophilic compound selected from the group consisting of ammonium di(2-ethyl hexyl) phosphate and an alkali metal di(2-ethyl hexyl) phosphate, and 1–5 percent by weight clay in finely divided form.

5. In the method of manufacturing an asphaltic bonded glass fiber mat, the step of coating the glass fibers in mat form with an asphaltic composition of claim 3 in which the concentration of the asphalt in the composition is within the range of 2–15 percent by weight.

6. In the method of producing fibrous structures of glass fibers and asphalt, the step of impregnating an asphalt bonded mat with an asphaltic composition claimed in claim 3 in which the concentration of the asphalt in the emulsion is 30–60 percent by weight.

7. In the method of manufacturing an asphaltic bonded glass fiber mat, the step of coating the glass fibers in mat form with an asphaltic composition of claim 4 in which the concentration of the asphalt in the composition is within the range of 2–15 percent by weight.

8. In the method of producing fibrous structures of glass fibers and asphalt, the step of impregnating an asphalt bonded mat with an asphaltic composition claimed in claim 4 in which the concentration of the asphalt in the emulsion is 30–60 percent by weight.

References Cited in the file of this patent

UNITED STATES PATENTS

| | | |
|---|---|---|
| 2,408,232 | Smith | Sept. 24, 1946 |
| 2,503,246 | Craig | Apr. 11, 1950 |
| 2,568,849 | Fasold | Sept. 25, 1951 |

FOREIGN PATENTS

| | | |
|---|---|---|
| 779,503 | France | Apr. 8, 1935 |